(12) United States Patent
Gieseke (10) Patent No.: US 7,370,425 B1
(45) Date of Patent: May 13, 2008

(54) APPARATUS OF AND METHOD OF USE OF A RADIUS TABLE AND RADIAL TEMPLATE FOR FORMING MUNTIN BAR PATTERNS FOR MULTI-PANE WINDOW UNITS

(76) Inventor: Gerald G. Gieseke, 2234 N. Wenas Rd., Selah, WA (US) 98942

( * ) Notice: Subject to any disclaimer, the term of this patent is extended or adjusted under 35 U.S.C. 154(b) by 0 days.

(21) Appl. No.: 11/698,388

(22) Filed: Jan. 26, 2007

(51) Int. Cl.
*B43L 13/00* (2006.01)
(52) U.S. Cl. ...................... 33/32.3; 33/27.01
(58) Field of Classification Search ............... 33/19.3, 33/21.1, 27.01, 27.03, 27.032, 27.04, 32.3
See application file for complete search history.

(56) References Cited

U.S. PATENT DOCUMENTS 2,034,177 A * 3/1936 Flatt ............................ 33/32.3
2,531,149 A * 11/1950 Melchor ....................... 33/32.3
5,915,807 A * 6/1999 Ilagan ........................... 33/471

\* cited by examiner

*Primary Examiner*—Yaritza Guadalupe-McCall
(74) *Attorney, Agent, or Firm*—Floyd E. Ivey (57) ABSTRACT

An apparatus of a radius table with spokes which supports a glass pane. The glass pane centered by a centering system. The spokes having a measuring device which is urged into contact with the glass pane thereby allowing determination of the required length of a false hollow muntin bar for formation of a muntin bar pattern within a multi-pane window unit. The cut muntin bars placed proximal spokes. A radial template placed proximal the placed muntin bars to secure the muntin bars to the radial template by muntin clamps. The radial template with attached muntin bars removed from the radius table and transported for fabrication of a multi-pane window unit.

8 Claims, 13 Drawing Sheets

APPARATUS OF AND METHOD OF USE OF A RADIUS TABLE AND RADIAL TEMPLATE FOR FORMING MUNTIN BAR PATTERNS FOR MULTI-PANE WINDOW UNITS

FIELD OF THE INVENTION

The present invention relates generally to an apparatus of determining the length for forming or cutting each false hollow muntin bar to length for a starburst or other pattern within multi-pane sealed window units and the method of using the apparatus and for securing and transporting the muntin bar pattern to a next phase of fabrication. Starburst and other patterns are commonly formed by muntin bar placement during and the fabrication of multi-pane sealed glass window units. The disclosure relates to the apparatus and method of determining the length required for each muntin bar in the pattern and the use of the template in the fabrication process for multi-pane window units.

BACKGROUND OF THE INVENTION

Forming patterns, within sealed multi-pane window units by placement of false hollow muntin bars, are commonly encountered. The determination of the length for each individual muntin bar, required for a pattern, is generally accomplished by a workman taking measurements, with a tape measure, from a muntin bar clip or muntin bar first end to the edge of the glass pane. This hand measurement process typically results in the assembly of the appropriate number of "cut to size" muntin bars. It will be expected to find that a generally symmetrical pane will require muntin bars of varying lengths.

In the typical multi-pane fabrication process a glass pane, for which muntin bars have been cut for a particular pattern, will be removed to an assembly area. The application of the muntin bars, in the process of forming the sealed multi-pane unit, is subject to smudging and inadvertent contamination of the bottom pane exposed during placement of each of the several muntin bars. Such contamination requires additional inspection and cleaning with attendant increased manufacturing expense. The patents referred to herein are provided herewith in an Information Disclosure Statement in accordance with 37 CFR 1.97.

SUMMARY OF THE INVENTION

The apparatus and process of using the apparatus disclosed herein eases several steps which must be performed in fabrication of a multi-pane window unit. First, the apparatus allows ease of measurement of the length required of each false hollow muntin bar required for a pattern. Second, the "cut to size" muntin bars are easily assembled with a central muntin bar clip. The assembled muntin bars with central muntin bar clip are easily secured to a radial pattern template which is transported, without disturbance of the precisely positioned muntin bars and central muntin bar clip, to the next phase of fabrication. And fabrication is completed.

The apparatus of this invention comprises a radius table (100) having a radius table frame (200) supporting one or more spokes (300) extending from a spoke anchor (5). Each spoke (300) supports a graduated measurement strip (400). The spoke (300) comprises a track which secures and guides measuring device (500). The measuring device (500) has a graduated measurement strip viewer (510) bearing at least one scribe mark (511).

A glass pane (800) is placed on the radius table (100) and is centered by a centering system (600). The measuring device (500) via the graduated measurement strip viewer (510) bearing at least one scribe mark (511) is moved into contact with the glass pane (800) and a muntin bar length, determined by at the scribe mark (511) viewing the graduated measurement strip (400), is noted at each spoke (300). The muntin bar length is used in cutting muntin bars as required for each pattern.

A central muntin bar clip (10) is placed on the spoke anchor (5) and the "cut to size" muntin bars (900) are affixed to the central muntin bar clip (10) forming the pattern. Multiple false hollow muntin bars will be received and secured by the central muntin bar clip (10). The central muntin bar clip (10) will be secured to the SUPER SPACER®, or other multi-pane spacing system structure thereby securing the muntin bars in position. A radial template (700) is placed over the pattern and, via one or more muntin clamps (710), each muntin bar (900) is clamped to the radial template (700). The radial template (700) bearing the clamped muntin bars (900) and central muntin bar clip (10) are transported to final fabrication for fabrication completion of a multi-pane window unit (2000).

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIGS. 8, 9, 10 and 11 illustrate a detail showing muntin bars (900) positioned at the radius table (100). Seen is the frame support (210), spokes (300), spoke anchor (5), graduated measurement strips (400), measuring devices (500), centering units (650), glass pane (800) and muntin bars (900). In detail 9, seen at FIG. 9, is illustrated the spoke (300), the graduated measurement strip (400), the measuring device (500), the muntin bar (900) and muntin bar clip (950). The muntin bar clip (950) is received into a false hollow muntin bar (900) and is inserted into or adjacent to a SUPER SPACER®, or other spacing system for multi-pane sealed window units. Detail 10, seen at FIG. 10 shows the spoke (300), the spoke anchor (5), the graduated measurement strip (400), the muntin bar (900) and the central muntin bar clip (10).

DETAILED DESCRIPTION

Figure 1:
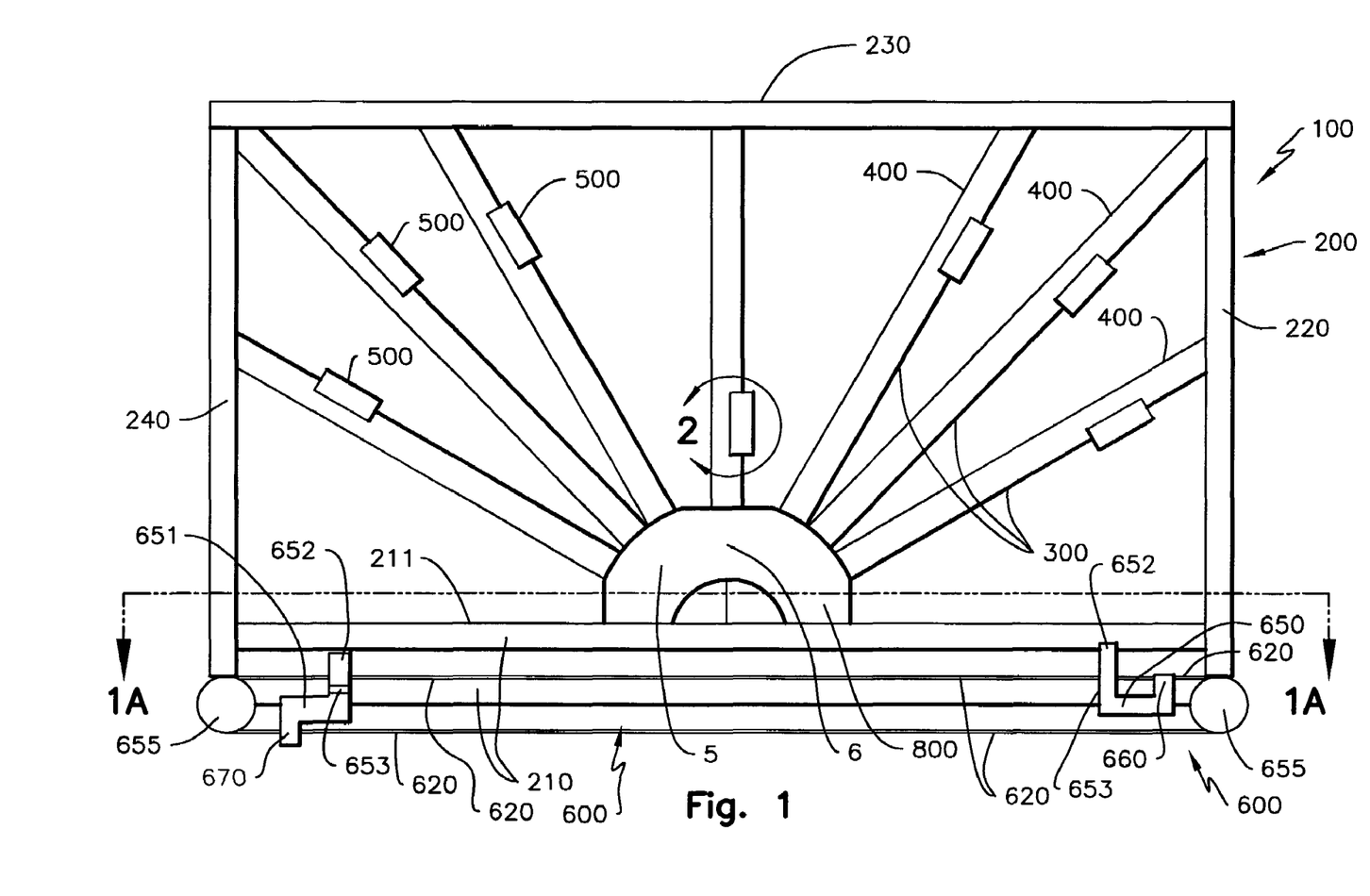
FIG. 1 is a plan view of the Radius table (100) showing the radius table frame (200) with frame support (210), frame right upright (220), frame top (230) and frame left upright (240). Illustrated are spokes (300), a spoke anchor (5), and affixed to or supported by the spokes (300) are graduated measurement strips (400). Also illustrated are measuring devices (500), a centering system (600) with centering unit right (650), centering unit left (651) and pulleys (655). Also seen is a glass pane (800).
Figures 8, 9, 10, 11:
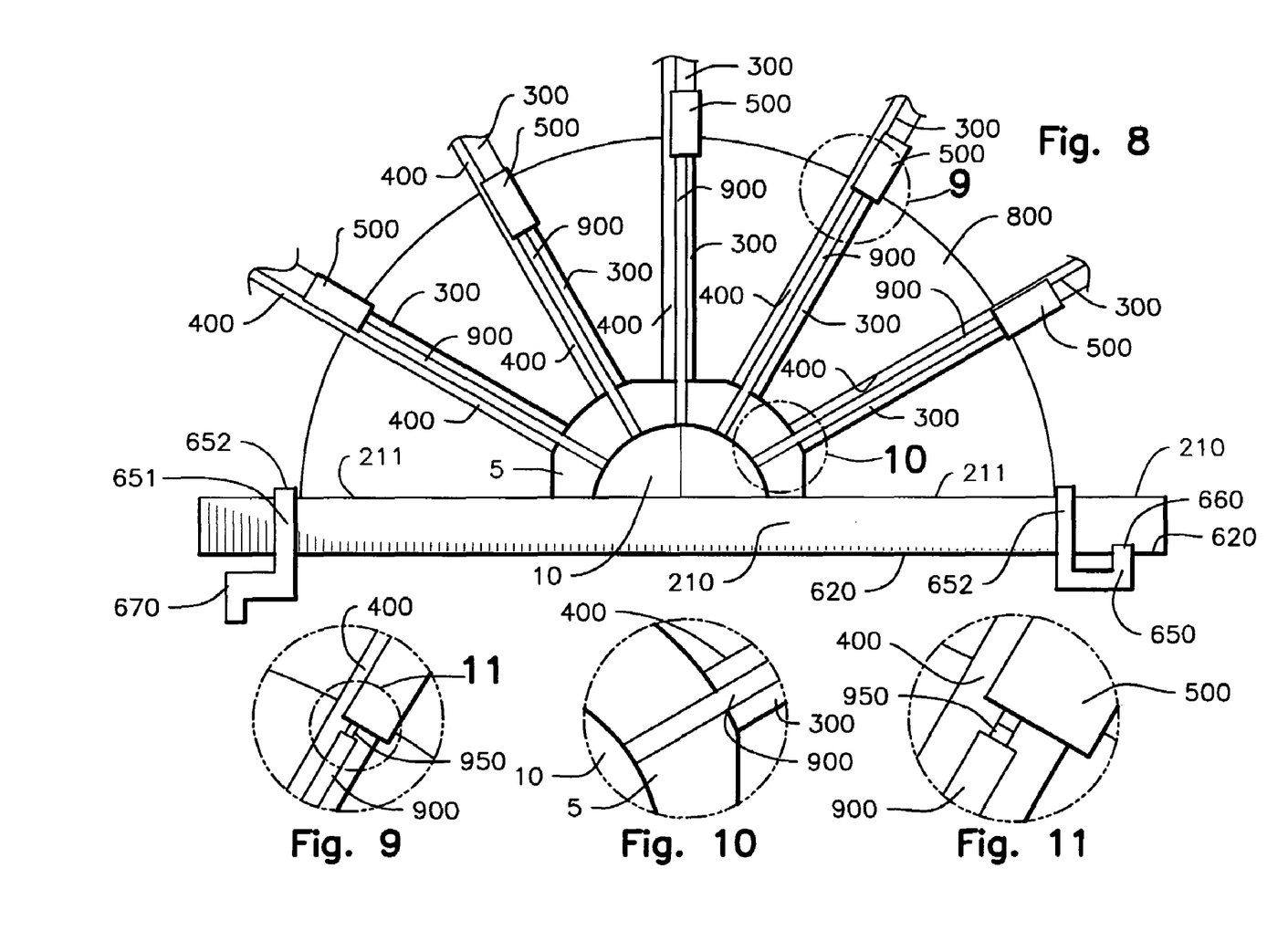
Figure 13:
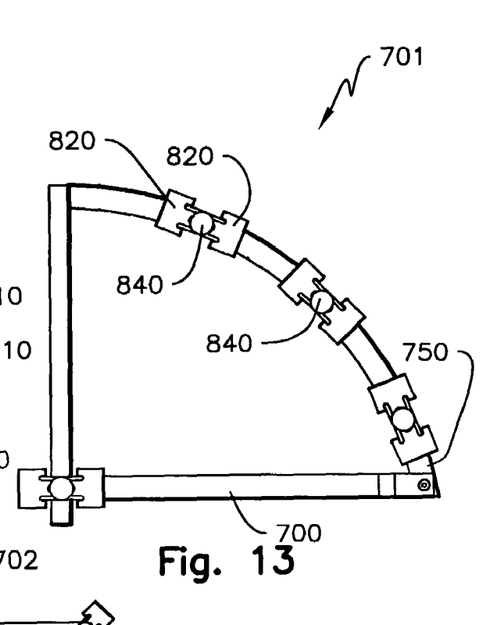
Figure 14:
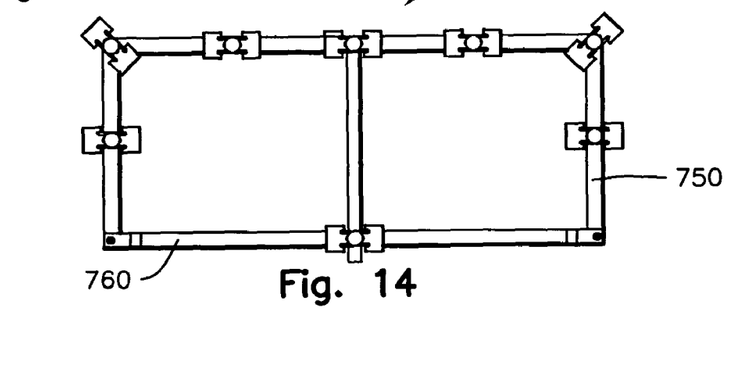
Figure 15:
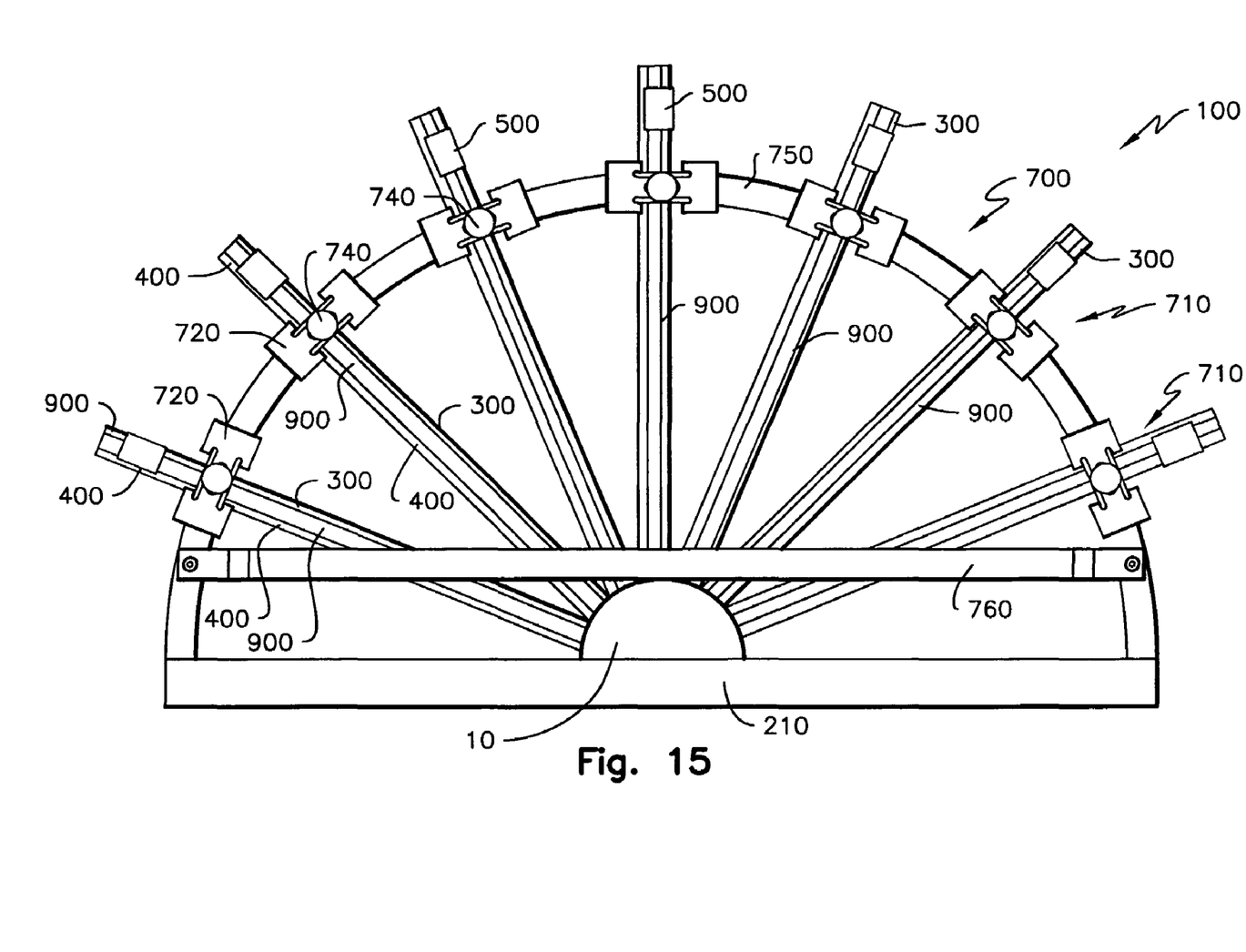
FIG. 15 illustrates a detail of the radius table (100) illustrating the placement of the radial template (700) for the securing of muntin bars (900). Shown is the radial template (700) with muntin bars (900) secured by muntin clamps (710) via muntin clamp screws (740).
Figure 16:
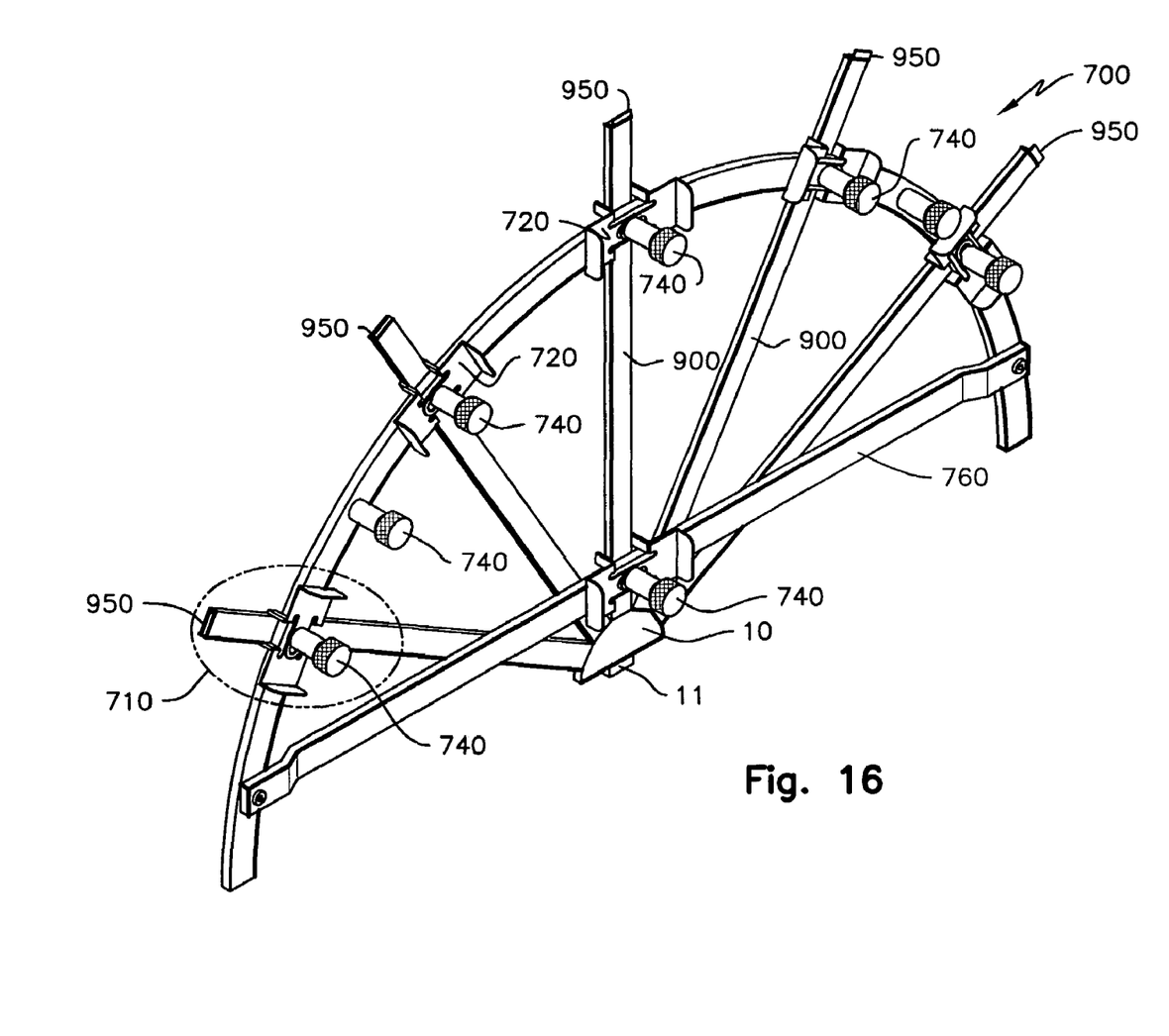
FIG. 16 illustrates the radial template (700), with muntin bars (900) muntin bars (900) secured by muntin clamps (710) via muntin clamp screws (740), removed from the radius table (100) and ready for transport to the next phase of fabrication. Also seen are muntin bar clips (950) and a central muntin bar clip (10).
Figure 17:
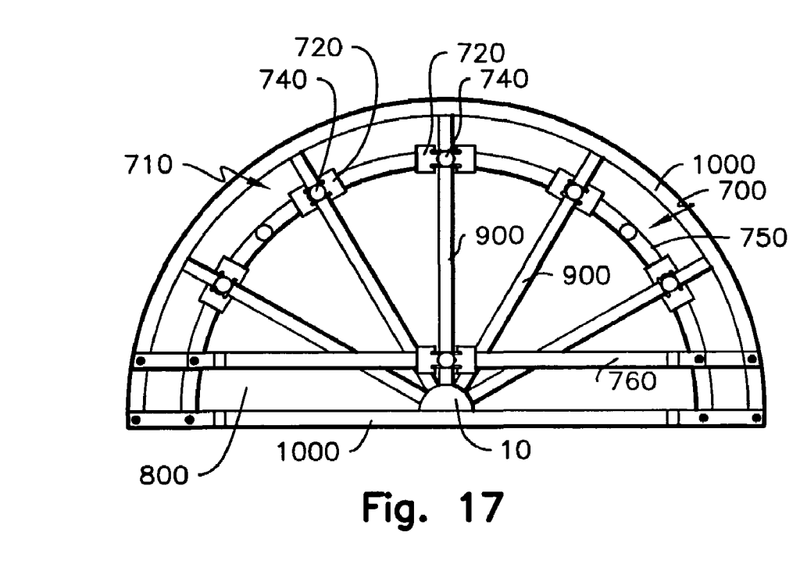
FIG. 17 shows the radial template (700) with muntin bars (900) placed on a glass pane (800) and positioned relative to a SUPER SPACER® or other spacing system for the placement of muntin bar clips (950) and a central muntin bar clip (10).
Figure 18:
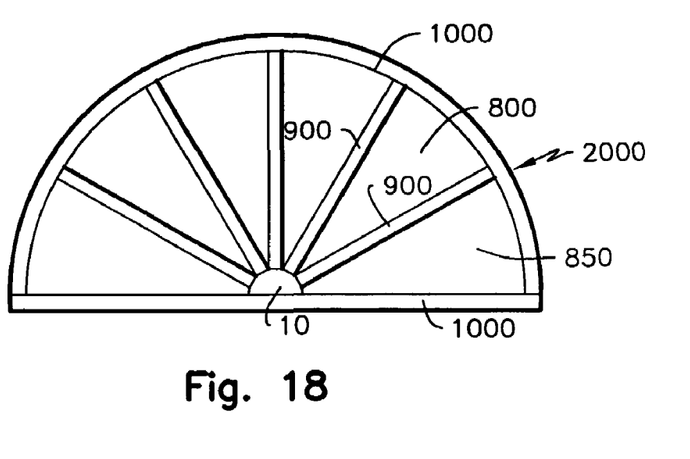
FIG. 18 illustrates the removal of the radial template (700), with fixing of the muntin bar clips (950) and central muntin bar clip (10) within a multi-pane window unit having a glass pane (800) and a second glass pane (850).

Seen in FIGS. 1, 8 and 15 is a radius table (100) and in FIGS. 12-17 is a radial template (700) utilized to assemble muntin bar patterns such as starburst patterns in multi-pane window sealed units. The radius table (100) has a radius table frame (200), at least one spoke (300) affixed to or supported by the radius table (100), a measuring device (500) slidably affixed to the at least one spoke (300), and a centering system (600) affixed to the radius table (100) to center a glass pane (800). The radius table (100) and at least one spoke (300) supports a radial template (700). The frame (200) and the spokes (300) are elongated rigid members.

The radius table frame (200) has a substantially horizontal frame support (210); an upwardly extending frame right upright (220) and an upwardly extending frame left upright (240) immovably affixed to the frame support (210). The frame left upright is immovably affixed to the frame support. The frame right upright (220) and the frame left upright (240) are immovably joined by a substantially horizontal frame top (230).

A spoke anchor (5), seen in FIG. 1, is immovably affixed to the frame support (210). One or more spokes (300) are immovably affixed to the spoke anchor (5) and extend outwardly toward and are immovably affixed to the frame right upright (220), the frame left upright (240) and or the frame top (220), to form a muntin bar pattern. Graduated measurement strips (400) are immovably affixed to or supported by each of the at least one spoke (300). In the preferred embodiment the graduated measurement strip will be affixed to be composed of a scribed metal bar which is screwed to the measuring device bottom (527). A spoke anchor scribe mark (6) is vertical and centered at the spoke anchor (5).

Figure 1A:
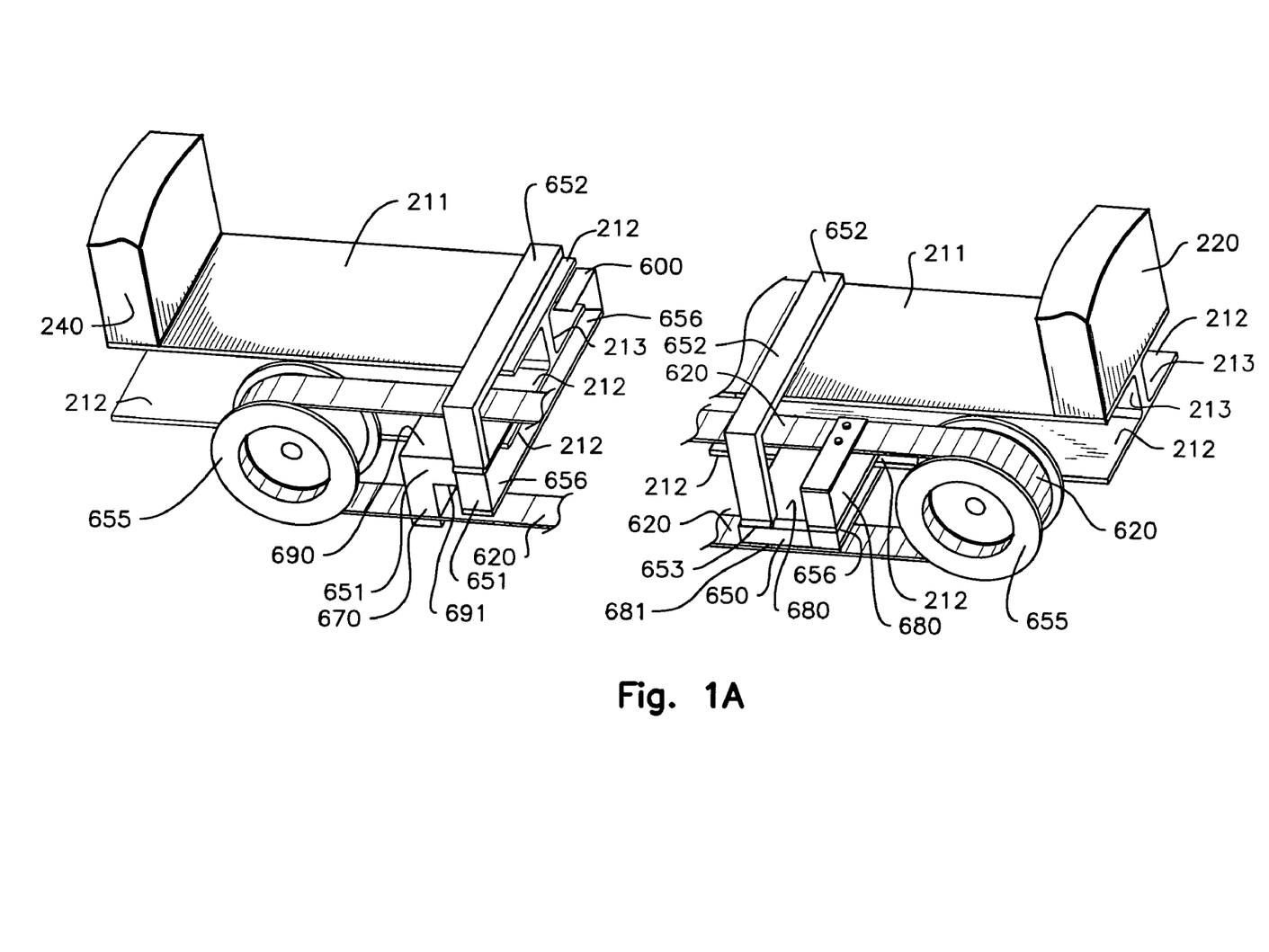
FIG. 1A is Section 1A from FIG. 1 showing detail of the centering system (600) illustrating the centering unit right (650), centering unit left (651), centering arm hinges (653), rail guide (654) and pulleys (655). Also illustrated is a rail guide slot (656), a centering flat belt (620), a centering flat belt attachment right (660) and a centering flat belt attachment left (670). Seen in this drawing is the frame support (210) as an "I" beam frame support rail guide (212).
Figure 2:
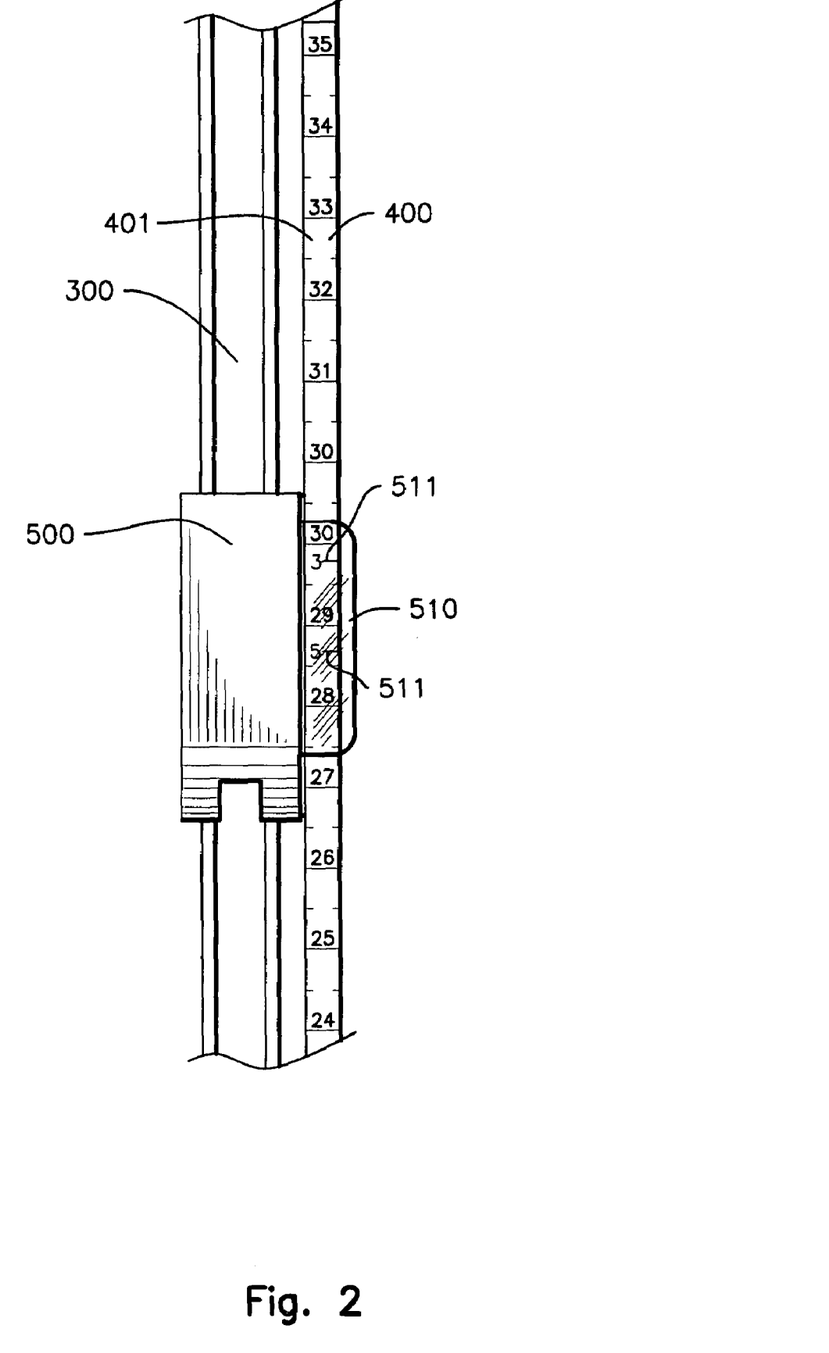
FIG. 2 is detail 2 from FIG. 1 illustrating a spoke (300), an attached or supported graduated measurement strip (400) and a measuring device (500) with measurement viewer (510) having at least one scribe mark (511).
Figure 3:
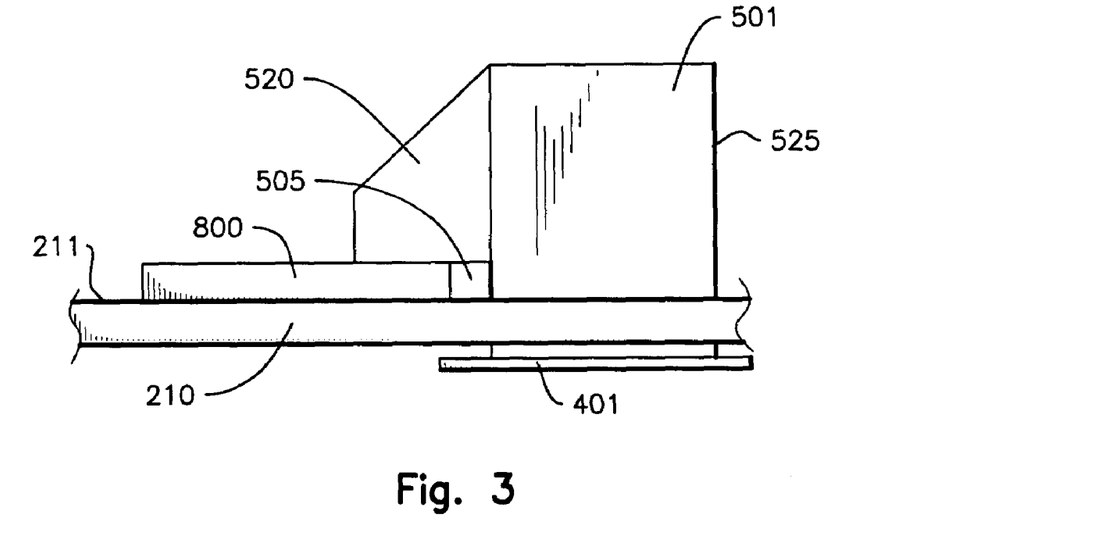
FIGS. 3, 3A, 4, 5 and 5A illustrate the measuring device (500) in right and left side elevation, top plan, perspective and cutaway perspective respectively. Seen is the measuring device (500) with measurement viewer (510) and scribe marks (511). Seen is the measuring device front (520) and the measuring device rear (525). Illustrated is the measuring device slot (530), the measuring device rail slot (540) and measuring device rail guide (550). Illustrated in FIGS. 3, 3A and 5A is the measuring device glass pane contact (505) and the measuring device front screw (522).
Figure 3A:
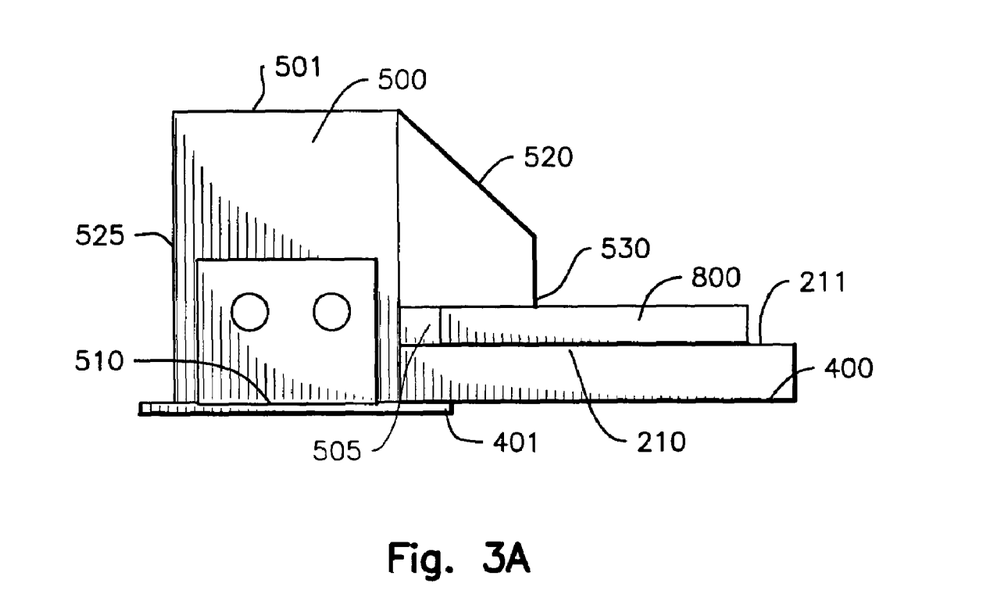
Figure 4:
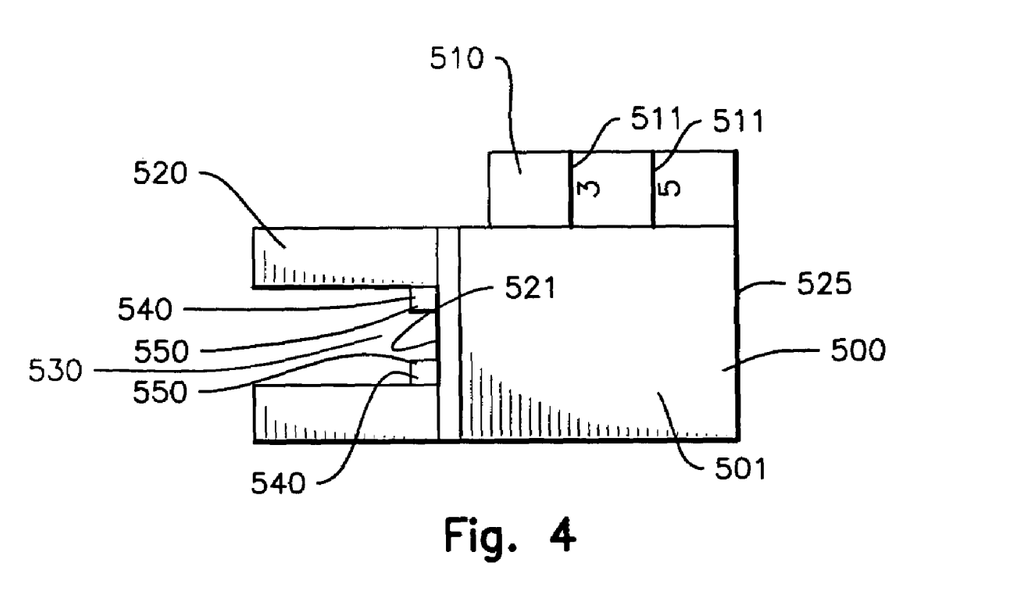
Figure 5:
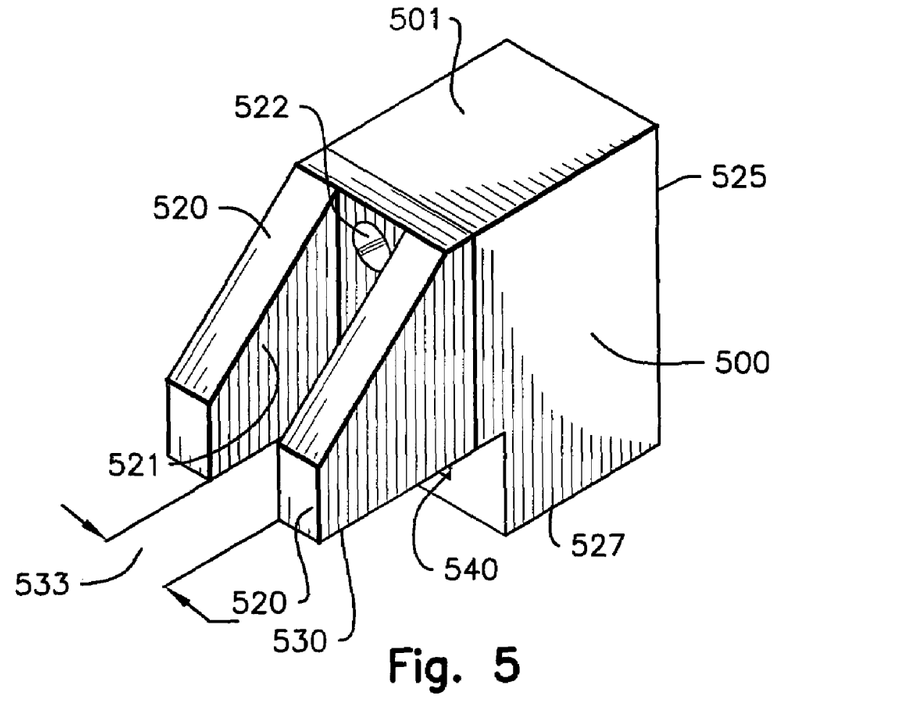
Figure 5A:
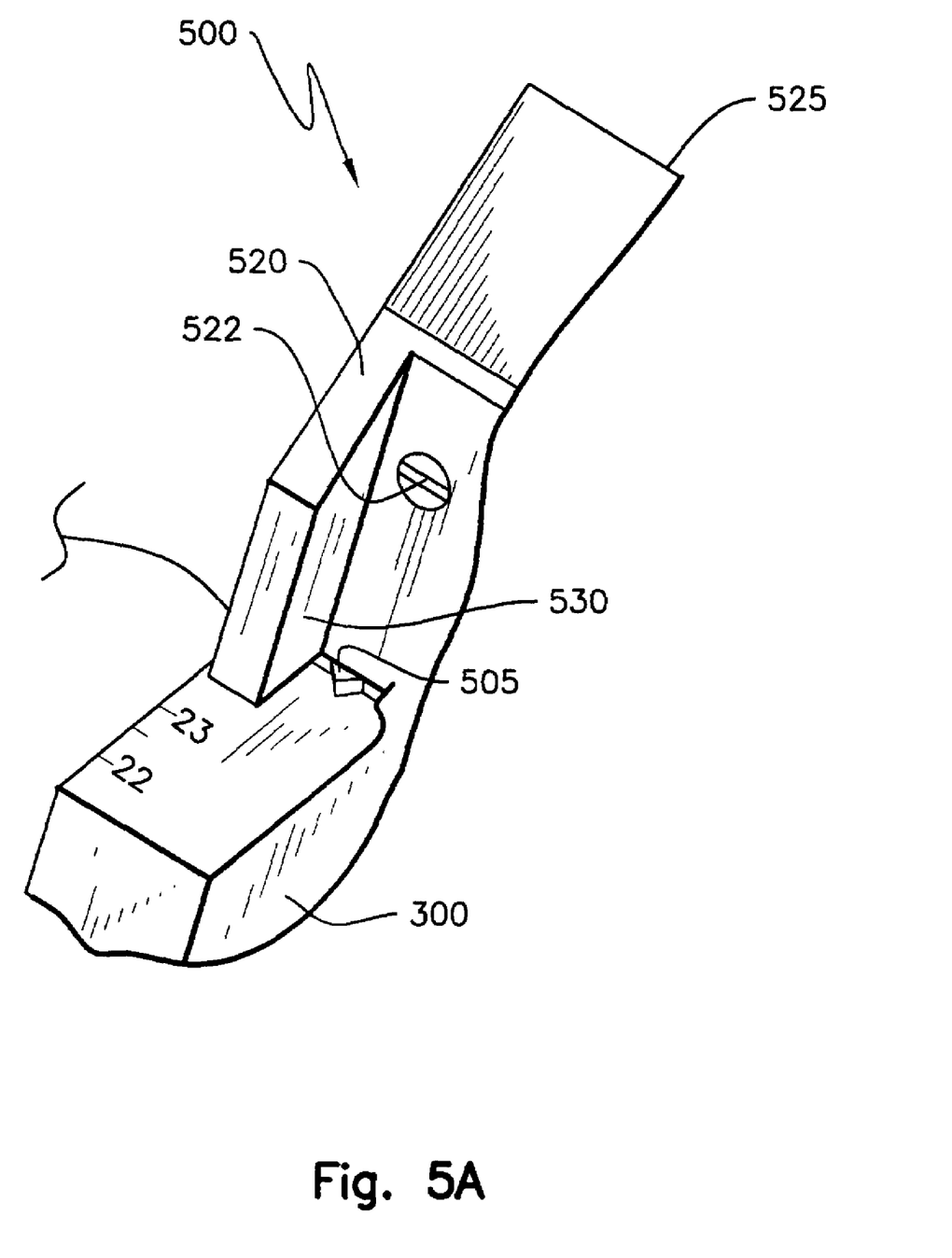

The centering system (600) illustrated in FIG. 1 and FIG. 1A is comprised of pulley (655) and flat belt (620) interconnected centering unit right (650) and centering unit left (651). In the preferred embodiment the flat belt (620) is composed of a flat belt. However, it will be appreciated that other band or cable means may be used for the interconnection. Each of the centering unit right (650) and centering unit left (651), seen in FIGS. 1, 1A, 6 and 7, have an a centering arm (652), upwardly extending from the respective centering unit right top (680) and centering unit left top (690) toward the frame support (210). The centering arm (652), proximal the frame support top (211), forms a 90 Degree angle with the centering arm (652) distal from the respective centering unit right top (680) and centering unit left top (690) slidably contacting the frame support top (211). Each of the respective centering arms (652) affixed by pivot means via a centering arm hinge (653) proximal to or at the respective centering unit right top (680) and the centering unit left top (690).

Figure 6:
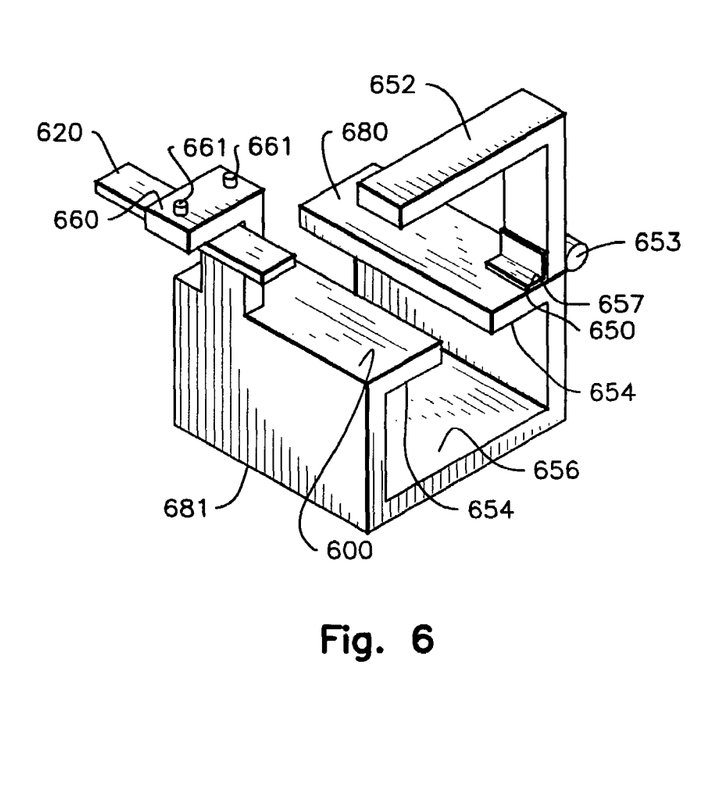
FIGS. 6 and 7 show the centering system (600) centering unit right (650), centering unit left (651), centering arms (652), centering arm hinges (653), rail guide (654), rail guide slot (656), centering flat belt (620), centering flat belt attachment right (660) and centering flat belt attachment left (670). The centering unit right (650) having a centering unit right top (680) and a centering unit right bottom (681). The centering unit left (651) having a centering unit left top (690) and a centering unit left bottom (691).
Figure 7:
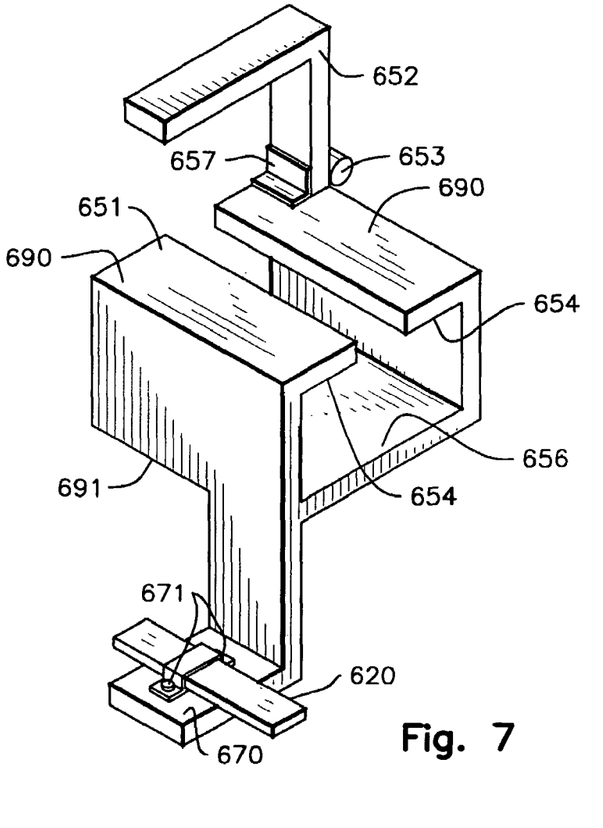

The centering arm (652) may be pivoted away from the frame support (200) to remove the centering arm (652) from the proximity of the frame support top (211) thereby allowing glass panes of larger sizes to be placed on the radius table (100). When pivoted upwardly toward the frame support (200) rotational movement toward the frame support (200) is limited by a stop means such as a centering arm stop (657) projecting toward the frame support (200) and contacting the respective centering unit right top (680) and centering unit left top (690). A variety of detent means will lock the respective centering arms (652) into place either when rotated up and into slidable contact with the frame support top (211) or when rotated down and away from the frame support (200).

Each of the centering unit right (650) and centering unit left (651) having a rail guide (654) and a rail guide slot (656) to slidably receive the "I" beam frame support (210).

Pulleys (655) respectively proximal the frame right upright (220) and the frame left upright (240) receive a tensioned centering flat belt (620). A centering flat belt attachment right (660) extends outwardly from the centering unit right (650) and is immovably affixed to the centering flat belt (620) centering flat belt affixing means. In the preferred embodiment the centering flat belt attachment right (660) extends upwardly and outwardly from the centering unit right top (680) and is affixed to the centering flat belt (620) proximal the frame support top (211). A centering flat belt attachment left (670) extends outwardly from the centering unit left (651) and is immovably affixed to the centering flat belt (620) by centering flat belt affixing means.

Centering flat belt affixing means, for the preferred embodiment comprises a plate pressing the centering flat belt (620) against the centering flat belt attachment right (660) and against the centering flat belt attachment left (680) wherein screw or bolt means is received through the plate and into the respective centering flat belt attachment right (660) and against the centering flat belt attachment left (680). In the preferred embodiment the centering flat belt attachment left (670) extends downwardly and outwardly from the centering unit left bottom (691) and is affixed to the centering flat belt (620) distal the frame support top (211).

As is appreciated, movement of either the centering unit right (650) or the centering unit left (651) will cause the each of the centering unit right (650) and the centering unit left (651) to move in opposite directions. That is, movement of the centering unit right (650) toward the center will cause the centering unit left (651) to move toward the center. A glass pane (800), placed on the frame support top (211), will be contacted and moved by the centering arm (652), of either the centering unit right (650) or the centering unit left (651), until the centering arm (652) of the opposing either centering unit right (650) or centering unit left (651) contacts the glass pane (800).

Movement of the centering arms (652) and the glass pane (800) will be to a predetermined calibrated position, which, in the preferred embodiment, is the center of the spoke anchor (5). It will be appreciated that a calibrated position may be other than the center of the spoke anchor (5) with this determined by the patterns to be formed and by the configuration of the table frame (200).

The radial template (700), seen in FIGS. 12-17, has a radial frame (750) member and a stabilizer frame member (760). In the preferred embodiment and for the purpose of forming a starburst muntin bar pattern, the radial frame (750) is semi-circular and the stabilizer frame member (760) is straight, both formed, in the preferred embodiment of rigid flat bar stock generally metal. One of ordinary skill in frame arts will recognize that many different frame shapes will suffice for the utility of this invention. At least one muntin clamp (710) is affixed to the radial frame (750) member and at least one muntin clamp (710) is affixed to the stabilizer frame (750) member.

A measurement viewer (510) having at least one scribe mark (511) is immovably attached to and extends outwardly from the measuring device (500), proximal to or over the graduated measurement strip (400), for viewing a measurement at the graduated measurement strip (400). The measurement viewer (510), in the preferred embodiment, is transparent. The measuring device (500) has a measuring device front (520), a measuring device body (501), a measuring device rear (525) and a measuring device bottom (527). The measuring device front (520) has a substantially vertical measuring device front muntin bar slot (521). The measuring device front (520) and measuring device front muntin bar slot (521) are distal to the measuring device rear (525). The measuring device front muntin bar slot (521) is sized to securely receive a muntin bar (900). The measuring device front (520) is immovably affixed to the muntin device body (501), by screw means via a measuring device front screw (522), during operations. The selection of the measuring device front (520) will be determined by the width of the muntin bar (900) to be used in forming a pattern and hence will dictate the width of the required muntin device front muntin bar slot (521).

There is a substantially horizontal measuring device slot (530) beneath the measuring device front (520), distal to the measuring device rear (525) and proximal the spoke (300). The measuring device slot (530) receives a glass pane (800) when the measuring device (500) is slidably moved into contact with the glass pane (800). A measuring device rail slot (540) and a measuring device rail guide (550) is received by the spoke (300). The spoke (300) has a substantially mirror image slot and rail to slidably receive the measuring device (500). A measuring device glass pane contact (505) beneath the measuring device front (520), proximal the measuring device bottom (527) and the measuring device slot (530) is contacted by a glass pane (800) when the measuring device (500) is slidably moved into contact with the glass pane (800). In the preferred embodiment the measuring device glass pane contact (505) is outwardly protruding to form a contact point. The measuring device body (501) and measuring device front (520) are composed of semi-rigid or rigid, materials including plastics. The measuring device glass pane contact (505) is composed of a semi-rigid material to lessen the likelihood of chipping the glass pane (800) upon contact.

FIGS. 1, 2, 15 and 17 illustrate the apparatus of the radius table (100) and the radial template (700) to a glass pane (800) of a multi-pane sealed window unit. It is seen that a glass pane (800) is supported by the frame support (210). The glass pane (800), when placed on the radius table (100) will not be precisely positioned for the purpose of measuring muntin bars (900) required for the formation of patterns. The glass pane (800) will be contacted by the substantially vertical centering front slot (652) and moved to the calibrated position proximal the spoke anchor (5).

The radius table frame (200), the at least one spoke (300), the measuring unit (500), the centering unit (650), and the radial template are comprised of elongated rigid materials including plastics, metals, composite materials and including aluminum rail.

Figure 12:
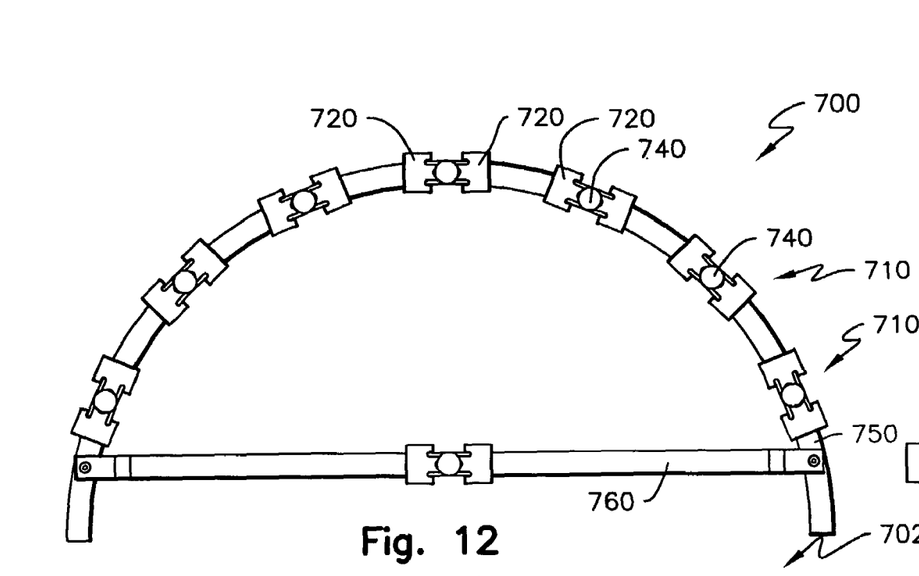
FIGS. 12, 13 and 14 show the radial template (700) with semi-circular radial frame (750), half semi-circular radial frame (750) and rectangular radial frame (750) respectively. Illustrated are muntin clamps (710) having muntin clamp compression jaws (720), muntin clamp screws (740), and a stabilizer frame (760).

The at least one muntin clamp (710) is affixed via muntin clamp screws (740) at the radial frame (750) and at the stabilizer frame (760). The radial frame (750) and the stabilizer frame (760) shaped to accommodate the muntin bar (900) pattern desired for fabrication.

Figure 19:
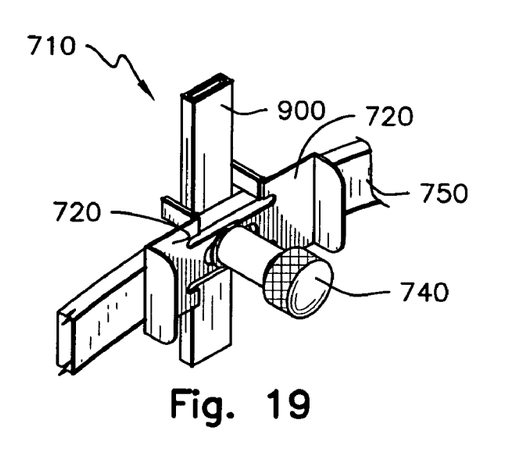
FIGS. 19, 20 and 21 illustrate a muntin clamp (710) comprising muntin clamp compression jaws (720) and a muntin clamp screw (740).
Figure 20:
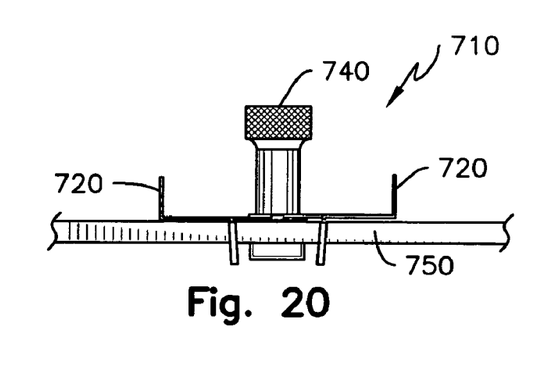
Figure 21:
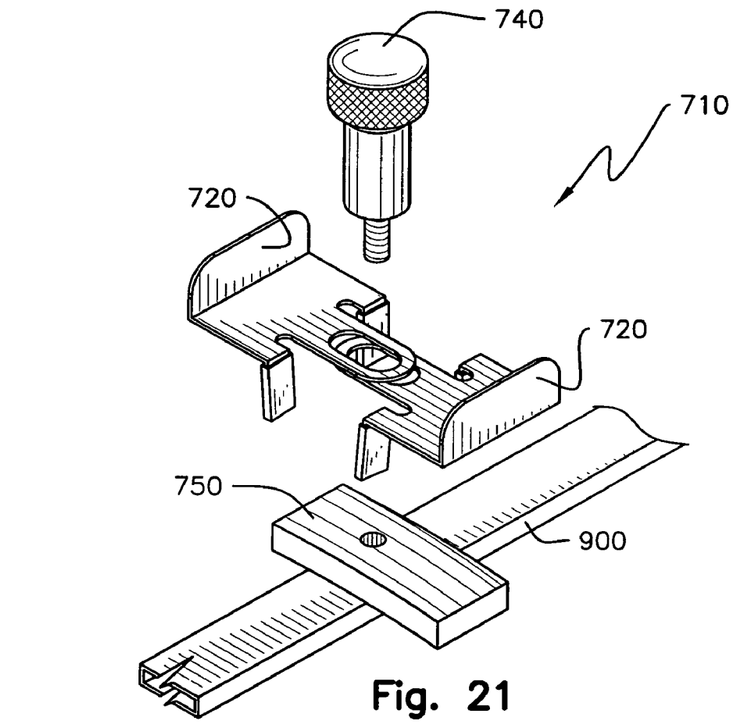

The muntin clamp (710) includes a threaded means, generally a threaded bolt immovably affixed to the radial frame (750) or stabilizer frame (760), which is upwardly extending from the radial frame (750) or the stabilizer frame (760). The clamp screw (740) threadably receives the upwardly extending threaded means. At least two opposing muntin clamp compression jaws (720) are slidably and movably retained by the upwardly extending threaded means and compressed between the clamp screw (740) and the radial frame (750) or stabilizer frame (760) when the clamp screw (740) is tightened.

The muntin clamp compression jaws (720) are also downwardly extending and have a spring bias to securely and immovably engage a muntin bar (900) when the opposing muntin clamp compression jaws (720) are urged toward each other and the clamp screw (740) is tightened. The muntin clamps (710) are positioned at the radial frame (750) and stabilizer frame (760) depending on the muntin bar pattern desired for fabrication.

A method of using the radius table (100) in combination with the radial template (700) to assemble muntin bars for multi-pane window unit fabrication is seen herein. The process is as follows:

a. calibrating the distance from the frame support (210) to the measuring device (500) at each spoke (300);

b. placing a glass pane (800) on the frame support (210) and against and supported by the spokes (300); urging the centering unit (650) toward the glass pane (800) and moving the glass pane (800) toward and centered at the spoke anchor (5);

c. moving the measuring devices (500) toward the glass pane (800) such that the measuring device slot (530) receives the glass pane (800); viewing the graduated measurement strip (400) through or proximal the measurement viewer (510) and noting the measurement at the scribe mark (511);

d. cutting false hollow muntin bars (900) to the lengths determined by the measurement;

e. placing a central muntin bar clip (10) proximal the spoke anchor (5); inserting a muntin bar clip (950) in each false hollow muntin bar (900) and attaching each false hollow muntin bar (900) to the central muntin bar clip (10) with the muntin bar clip (950) distal to the central muntin bar clip (10);

f. placing a radial template (700) over and into contact with the central muntin bar clip (10) and the muntin bars (900); opening the muntin clamp compression jaws (720) to receive the respective muntin bar (900); urging the opposing muntin clamp compression jaws (720) together and tightening the respective muntin clamp screw (740) thereby securing the respective muntin bar (900);

g. removing the radial template (700) with respective muntin bars (900) and transporting the radial template (700) and muntin bars (900) for multi-pane window unit fabrication;

h. placing the radial template (700) with muntin bars (900) in a glass pane (800) with a SUPER SPACER® or other spacing system for the placement of muntin bar clips (950) and a central muntin bar clip (10) relative to the SUPER SPACER® or other spacing system; placing a second glass pane (850) over the placed muntin bars (900) forming a multi-pane window unit.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An apparatus to assemble muntin bar patterns comprising:
    a. a radius table (100) having a radius table frame (200);
    b. at least one spoke (300) affixed to or supported by the radius table frame (200);
    c. a measuring device (500) slidably affixed to the at least one spoke (300);
    d. a centering system (600) affixed to the radius table (100) to center a glass pane (800);
    e. the radius table (100), the radius table frame (200) and the at least one spoke (300) supporting a radial template (700).

2. The apparatus of claim 1 further comprising:
    a. the radius table frame (200) having a substantially horizontal frame support (210); an upwardly extending frame right upright (220) and an upwardly extending frame left upright (240) immovably affixed to the frame support (210); the frame right upright (220) and the frame left upright (240) immovably joined by a substantially horizontal frame top (230) distal to the frame support (210); the table frame (200) members formed of elongated rigid materials, generally metals;
    b. a spoke anchor (5) immovably affixed to the frame support (210); one or more spokes (300) extending outwardly toward and immovably affixed to the frame right upright (220), the frame left upright (240) and or the frame top (220), to form a muntin bar pattern; the one or more spokes (300) are elongated and rigid generally formed of metal;
    c. a graduated measurement strip (400) immovably affixed to or supported by each of the at one or more spokes (300);
    d. a measurement viewer (510) having at least one scribe mark (511) is immovably attached to and extends outwardly from the measuring device (500), proximal to or over the graduated measurement strip (400), for viewing a measurement at the graduated measurement strip (400); the measuring device (500) has a measuring device front (520), a measuring device body (501), a measuring device rear (525) and a measuring device bottom (527);
    e. there is a substantially horizontal measuring device slot (530) beneath the measuring device front (520), distal to the measuring device rear (525) and proximal the spoke (300); the measuring device slot (530) is sized to receive a glass pane (800) when the measuring device (500) is slidably moved into contact with the glass pane (800); a measuring device rail slot (540) and a measuring device rail guide (550) is received by the spoke (300); the spoke (300) has a substantially mirror image slot and rail to slidably receive the measuring device (500);
    f. the centering system (600) comprised of pulley (655) and centering flat belt (620) interconnected centering unit right (650) and centering unit left (651); the centering unit right (650) and centering unit left (651) slidably affixed to the frame support (210); the frame support (210) having a frame support top (211);
    g. the radial template (700) having a radial frame (750) member and a stabilizer frame member (760); at least one muntin clamp (710) affixed to the radial frame (750) member; at least one muntin clamp (710) affixed to the stabilizer frame (750) member.

3. The apparatus of claim 2 further comprising:
    a. the measuring device (500) having a measuring device front (520) and a measuring device rear (525); a measuring device slot (530) at the measuring device front (520) proximal the spoke (300); a measuring device rail slot (540) and a measuring device rail guide (550) received by the spoke (300); the spoke (300) having a substantially mirror image slot and rail to slidably receive the measuring device (500); the measurement viewer (510) is transparent;
    b. each of the centering unit right (650) and centering unit left (651) have an a centering arm (652), upwardly extending from a respective centering unit right top (680) and centering unit left top (690) toward the frame support (210); the respective centering arms (652) bent, distal to the respective centering unit right top (680) and centering unit left top (690), to be parallel to and slidably contacting the frame support top (211);
    c. a glass pane (800) supported by the frame support (210) will be contacted by the centering front slot (652) and moved to a calibrated position proximal the spoke anchor (5);
    d. the radius table frame (200), the at least one spoke (300), the measuring unit (500), the centering unit (650), and the radial template comprised of rigid materials including plastics, metals, composite materials and including aluminum rail.

4. The apparatus of claim 3 further comprising:
a. the at least one muntin clamp (710) affixed via muntin clamp screws (740) at the radial frame (750) and at the stabilizer frame (760);
b. the radial frame (750) and the stabilizer frame (760) shaped to accommodate the muntin bar (900) pattern desired for fabrication;
c. each of the respective centering arms (652), proximal the frame support top (211), forms a 90 Degree angle with the centering arm (652) distal from the respective centering unit right top (680) and centering unit left top (690); each of the respective centering arms (652) affixed by pivot means via a centering arm hinge (653) proximal to or at the respective centering unit right top (680) and the centering unit left top (690);
d. the measuring device front (520) has a substantially vertical measuring device front muntin bar slot (521); the measuring device front (520) and measuring device front muntin bar slot (521) are distal to the measuring device rear (525); the measuring device front muntin bar slot (521) is sized to securely receive a muntin bar (900); a measuring device glass pane contact (505) beneath the measuring device front (520), proximal the measuring device bottom (527) and the measuring device slot (530) is contacted by a glass pane (800) when the measuring device (500) is slidably moved into contact with the glass pane (800).

5. The apparatus of claim 4 further comprising:
a. the muntin clamp (710) receiving a threaded means upwardly extending from the radial frame (750) or the stabilizer frame (760); the clamp screw (740) threadably receiving the upwardly extending threaded means; at least two opposing muntin clamp compression jaws (720) slidably and movably retained by the upwardly extending threaded means and compressed between the clamp screw (740) and the radial frame (750) or stabilizer frame (760) when the clamp screw (740) is tightened;
b. the muntin clamp compression jaws (720) downwardly extending and having a spring bias to securely and immovably engage a muntin bar when the opposing muntin clamps (710) are urged toward each other and the clamp screw (740) is tightened;
c. muntin clamps (710) are positioned at the radial frame (750) and stabilizer frame (760) depending on the muntin bar pattern desired for fabrication. muntin clamp compression jaws (720) and a muntin clamp screw (740);
d. each of the respective centering arms (652), by the respective centering arm hinge (653), pivots away from the frame support (200), to remove the centering arm (652) from the proximity of the frame support top (211) or pivots upwardly toward the frame support (200); rotational movement upwardly toward the frame support (200) is limited by a stop means via a centering arm stop (657) projecting outwardly from the respective centering arms (652), proximal the respective centering unit right top (680) and centering unit left top (690), to contact the respective centering unit right top (680) and centering unit left top (690); detent means will lock the respective centering arms (652) into place either when rotated up and into slidable contact with the frame support top (211) or when rotated down and away from the frame support (200);
e. each of the centering unit right (650) and centering unit left (651) having a rail guide (654) and a rail guide slot (656) to slidably receive a "I" beam frame support (210);
f. pulleys (655) respectively proximal the frame right upright (220) and the frame left upright (240) receive a tensioned centering flat belt (620); a centering flat belt attachment right (660) extends outwardly from the centering unit right (650) and is immovably affixed to the centering flat belt (620) centering flat belt affixing means; the flat belt (620) may be composed of a belt, a band or a cable;
g. the measuring device front (520) is immovably affixed to the muntin device body (501), by screw means via a measuring device front screw (522), during operations; the measuring device glass pane contact (505) is outwardly protruding to form a glass pane contact point.

6. The apparatus of claim 5 further comprising:
a. the centering flat belt attachment right (660) extends upwardly and outwardly from the centering unit right top (680) and is immovably affixed to the centering flat belt (620) proximal the frame support top (211); a centering flat belt attachment left (670) extends outwardly from the centering unit left (651) and is immovably affixed to the centering flat belt (620) by centering flat belt affixing means.

7. The apparatus of claim 6 further comprising:
a. centering flat belt affixing means, for the preferred embodiment comprises a plate (671) pressing the centering flat belt (620) against the centering flat belt attachment right (660) and against the centering flat belt attachment left (680) wherein screw or bolt means (671) is received through the plate and into the respective centering flat belt attachment right (660) and against the centering flat belt attachment left (680);
b. in the preferred embodiment the centering flat belt attachment right (660) extends upwardly and outwardly from the centering unit right top (680) and is affixed to the centering flat belt (620) proximal the frame support top (211); in the preferred embodiment the centering flat belt attachment left (670) extends downwardly and outwardly from the centering unit left bottom (691) and is affixed to the centering flat belt (620) distal the frame support top (211).

8. A method of using the radius table (100) and radial template (700) to assemble muntin bars for multi-pane window unit fabrication comprising:
a. calibrating the distance from the frame support (210) to the measuring device (500) at each spoke (300); calibrating the centering arms (652) relative to the frame support (210) or the spoke anchor (5);
b. placing a glass pane (800) on the frame support (210) and against and supported by the spokes (300); urging the centering unit (650) centering arms (652), where the glass pane (800) is symmetrical, toward the glass pane (800) and moving the glass pane (800) toward and centered at the spoke anchor (5); rotating the centering arms (652) downward, where the glass pane (800) is not symmetrical or larger than the radius table (100), and manually positioning the glass pane (800) for muntin bar (900) measurement;
c. moving the measuring devices (500) toward the glass pane (800) such that the measuring device slot (530) receives the glass pane (800); viewing the graduated measurement strip (400) through or proximal the measurement viewer (510) and noting the measurement at the scribe mark (511);

d. cutting false hollow muntin bars (900) to the lengths determined by the measurement;

e. placing a central muntin bar clip (10) proximal the spoke anchor (5); inserting a muntin bar clip (950) in each false hollow muntin bar (900) and attaching each false hollow muntin bar (900) to the central muntin bar clip (10) with the muntin bar clip (950) distal to the central muntin bar clip (10);

f. placing a radial template (700) over and into contact with the central muntin bar clip (10) and the muntin bars (900); opening the muntin clamp compression jaws (720) to receive the respective muntin bar (900); urging the opposing muntin clamp compression jaws (720) together and tightening the respective muntin clamp screw (740) thereby securing the respective muntin bar (900);

g. removing the radial template (700) with respective muntin bars (900) and transporting the radial template (700) and muntin bars (900) for multi-pane window unit fabrication;

h. placing the radial template (700) with muntin bars (900) in a glass pane (800) with a SUPER SPACER® or other spacing system for the placement of muntin bar clips (950) and a central muntin bar clip (10) relative to the SUPER SPACER® or other spacing system; placing a second glass pane (850) over the placed muntin bars (900) forming a multi-pane window unit.

* * * * *